US006006177A

United States Patent [19]

Funaki

[11] Patent Number: 6,006,177

[45] Date of Patent: Dec. 21, 1999

[54] APPARATUS FOR TRANSMITTING SYNTHESIZED SPEECH WITH HIGH QUALITY AT A LOW BIT RATE

[75] Inventor: Keiichi Funaki, Tokyo, Japan

[73] Assignee: NEC Corporation, Tokyo, Japan

[21] Appl. No.: 08/634,386

[22] Filed: Apr. 18, 1996

[30] Foreign Application Priority Data

Apr. 20, 1995 [JP] Japan .................................... 7-095460

[51] Int. Cl.$^{6}$ ........................................................ G01L 3/02

[52] U.S. Cl. ........................... 704/220; 704/221; 704/222

[58] Field of Search ............................. 395/2.3–232, 2.33

[56] References Cited

U.S. PATENT DOCUMENTS

| | | | |
|---|---|---|---|
| 5,265,190 | 11/1993 | Yip et al. | 395/2.28 |
| 5,327,519 | 7/1994 | Haggvist et al. | 395/2.28 |
| 5,359,696 | 10/1994 | Gerson et al. | 395/2.32 |
| 5,396,576 | 3/1995 | Miki et al. | 395/2.31 |
| 5,426,718 | 6/1995 | Funaki et al. | 395/2.25 |
| 5,485,581 | 1/1996 | Miyano et al. | 395/2.32 |
| 5,487,086 | 1/1996 | Bhaskar | 375/243 |
| 5,487,128 | 1/1996 | Ozawa | 395/2.31 |
| 5,524,170 | 6/1996 | Matsuo et al. | 395/2.31 |
| 5,598,504 | 1/1997 | Miyano | 395/2.31 |
| 5,602,961 | 2/1997 | Kolesnik et al. | 395/2.32 |
| 5,625,744 | 4/1997 | Ozawa | 395/2.31 |
| 5,633,980 | 5/1997 | Ozawa | 395/2.31 |

FOREIGN PATENT DOCUMENTS

| | | |
|---|---|---|
| 61-134000 | 6/1986 | Japan . |
| 3-274100 | 12/1991 | Japan . |
| 6-222797 | 8/1994 | Japan . |
| 7-86952 | 3/1995 | Japan . |

OTHER PUBLICATIONS

M.R. Schroeder et al., "Code–Excited Linear Prediction (CELP): High–Quality Speech at Very Low Bit Rates", *ICASSP Proceedings 85*, 1985, pp. 937–940.

*Primary Examiner*—David R. Hudspeth
*Assistant Examiner*—Michael N. Opsasnick
*Attorney, Agent, or Firm*—Sughrue, Mion, Zinn, Macpeak & Seas, PLLC

[57] ABSTRACT

The invention provides a speech coding apparatus wherein a perceptual weighting filter is realized with a comparatively small amount of calculation. The speech coding apparatus includes a weighting circuit which in turn includes a coefficient code book in which weighting coefficients are stored, a coefficient determination section which selects and outputs one of the weighting coefficients which corresponds to a short-term prediction code, and a weighting section for performing weighting calculation of a speech signal with the selected weighting coefficient.

6 Claims, 4 Drawing Sheets

APPARATUS FOR TRANSMITTING SYNTHESIZED SPEECH WITH HIGH QUALITY AT A LOW BIT RATE

BACKGROUND OF THE INVENTION

1. Field of the Invention

This invention relates to a speech coding apparatus, and more particularly to a speech coding apparatus employing code-excited linear predictive coding (CELP) or a like system which codes a speech signal at a low bit rate with a high quality.

2. Description of the Related Art

In recent years, application of digital systems to land mobile telephones and cordless telephones which employ radio waves as a medium has been and is proceeding rapidly. Since the frequency band which can be used for telephones of the type mentioned is limited in radio waves, in order to reduce an occupied band, it is important to develop a coding system for a speech signal of a low bit rate.

As one of coding systems of the type mentioned wherein the bit rate ranges approximately from 8 to 4 kb/s, a CELP system is known which is disclosed, for example, in M. R. Schroeder and B. S. Atal, "Code-excited linear prediction (CELP): High quality speech at low bit rates", ICASSP Proceedings 85, 1985, America, pp.937–940 (hereinafter referred to as document 1).

In the CELP system as a conventional speech coding apparatus disclosed in the document 1, coding processing is performed on the transmission side in the following procedure. First, for each frame (for example, 20 ms), a short-term predictive code representative of a frequency characteristic of speech, that is, a spectrum parameter, is extracted from a speech signal of an object of coding (short-term prediction). Then, each frame is divided into sub frames of a shorter period (for example, 5 ms). Then, for each sub frame, a pitch parameter representative of a long-term correlation (pitch correlation) is extracted from speech excitation signals in the past, and the speech signal of the sub frame is long-term predicted with the pitch parameter. The long-term prediction is performed by determining a delay code representative of a pitch correlation using an adaptive code book which includes speech excitation signals of a sub frame length, that is, adaptive code vectors, obtained by delaying speech excitation signals in the past by intervals corresponding to delay samples corresponding to delay codes of the speech excitation signals. The delay code is determined in the following procedure. In particular, a delay code is varied (attempted) by sizes of the adaptive code book to extract adaptive code vectors corresponding to the resulting delay codes. A synthesis signal is produced using the thus extracted adaptive code vectors, and an error power of the synthesis signal from the speech signal is calculated. An optimum delay code with which the thus calculated error power exhibits the lowest value, an adaptive code vector which corresponds to the optimum delay code and gains for them are determined.

Then, a speech excitation code vector with which the error power between a noise signal which is a quantization code of a kind prepared in advance, that is, a synthesis signal produced from an excitation code vector extracted from a speech excitation code book and a residual signal obtained by long-term prediction exhibits the lowest value and a gain for the speech excitation code vector are determined. This processing will be hereinafter referred to as speech excitation code book search.

Indices representative of the kinds of the adaptive code vector and the speech excitation code vector and the gains for the individual speech excitation signals determined in such a manner as described above as well as an index representative of the type of a spectral parameter are transmitted.

The search for a delay code of an adaptive code vector and a quantization code of an excitation code vector is specifically performed in the following procedure. First, in order to reduce quantization noises of filter coefficients of a synthesis filter formed from a spectrum parameter determined by a short-term predictive code and quantized/dequantized, a speech signal x[n] inputted is multiplied by a perceptual weighting filter W(z) defined by the following equation:

$$W(z)=\{A(z/\gamma 1)\}/\{A(z/\gamma 2)\} \tag{1}$$

where A(z) are filters representing the opposite characteristics to those of the synthesis filter described above, and γ1 and γ2 are weighting coefficients representing characteristics of the perceptual weighting filter.

Then, a weighting synthesis filter HV wherein the synthesis filter 1/A(z) and the perceptual weighting filter W(z) are connected in cascade connection is driven with a code vector ej[n] of a quantization code j to calculate a synthesis signal Hej[n]. Thereafter, the quantization code j with which the error power E between a signal z[n] and the signal Hej[n] exhibits the lowest value in the following equation is determined:

$$Ej = \sum_{n=0}^{Ns-1} (z[n] - g_{ej} \cdot H \cdot ej[n])^2 \tag{2}$$

where Ns is a sub frame length, H is a matrix which realizes the synthesis filter, and $g_{ej}$ is a gain of the code vector ej.

Since the weighting coefficients γ1 and γ2 are usually set to γ1=1.0 and γ2=0.8, respectively, the characteristic of the weighting synthesis filter HV is given by the following equation:

$$HV=1/A(z/0.8)$$

A weighting synthesis filter having the characteristic is used commonly.

In this instance, since the weighting synthesis filter HV for a code book search is of the full pole type and one of two terms of an object of calculation is a constant, the calculation amount for the calculation (number of times of product-summing) is not very great. Where the calculation is performed with a common digital signal processor (DSP) which includes a RAM and a ROM and has a data point for each of the RAM and the ROM, constants of the data points are stored in the ROM while variables are stored in the RAM to perform a predetermined calculation.

FIG. 4 shows a conventional speech coding apparatus. Referring to FIG. 4, the speech coding apparatus shown includes a coding section 1 for coding a speech input signal, a decoding section 2 for decoding the coded signal, and a transmission line 3 for interconnecting the decoding section 2 and the coding section 1.

The coding section 1 includes a buffer circuit 11 for storing a speech signal SI inputted from an input terminal TI and outputting a speech signal S, a short-term prediction circuit 12 for extracting an LPC coefficient which is a spectrum parameter of speech, a parameter quantization circuit 13 for quantizing the LPC coefficient to produce a short-term predictive code CL, a weighting circuit 14 for perceptual weighting the speech signal S and outputting a weighted speech signal SW, an adaptive code book 15 for storing excitations in the past, a long-term prediction circuit 16 for searching for an adaptive code vector which is a delay code representative of a pitch correlation, an excitation code book 17 in which excitation code vectors of a sub frame length representative of a long-term predictive residual are stored, an excitation code book search circuit 18 for determining an optimum excitation code vector from the excitation code book 17, a gain code book 19 in which parameters representative of gain terms of an adaptive code vector and an excitation code vector are stored, a gain code book search circuit 40 for determining quantization gains of an adaptive code vector and an excitation code vector from the gain code book 19, and a multiplexer 41 for combining code trains and outputting the combination of code trains.

The decoding section 2 includes a demultiplexer 21 for decoding transmission codes supplied thereto into predetermined code trains, an adaptive code book 22 same as the adaptive code book 15, an excitation code book 23 same as the excitation code book 17, a gain code book 24 same as the gain code book 19, a synthesis filter 25 for regenerating a speech signal from an excitation produced and a speech synthesis filter, and an output terminal TO for outputting speech.

A flow of processes of the conventional speech coding circuit will be described with reference to FIG. 4. The coding section 1 receives a speech signal SI through the input terminal TI and stores the speech signal SI into the buffer circuit 11. Using the speech signal S of a fixed sample stored in the buffer circuit 11, the short-term prediction circuit 12 performs a short-term predictive analysis to calculate an LPC coefficient of the speech signal. The LPC coefficient thus calculated is quantized by the parameter quantization circuit 13, and the quantized code of the LPC coefficient, that is, a short-term predictive code CL, is sent to the multiplexer 41, and is dequantized so that it may be used for later coding processing.

Meanwhile, the speech signal S stored in the buffer circuit 11 is perceptual weighted by the weighting circuit 14 using a quantized/dequantized LPC coefficient CL and is thus supplied as a weighted speech signal SW to the long-term prediction circuit 16, the excitation code book search circuit 18 and the gain code book search circuit 40 so that it is used for a search of code books.

Then, using the adaptive code book 15, the excitation code book 17 and the gain code book 19, a search for code books of the signal SW is performed. First, long-term prediction is performed by the long-term prediction circuit 16 to determine an optimum delay code CD representative of a pitch correlation in such a manner as hereinafter described, and the delay code CD is transferred to the multiplexer 41. Further, the long-term prediction circuit 16 produces a corresponding adaptive code vector. Then, after subtraction of an influence of the adaptive code vector, the excitation code book search circuit 18 performs a search of the excitation code book 17 to determine a quantization code CS and produces an excitation code vector. The quantization code is transferred to the multiplexer 41. After the adaptive code vector and the excitation code vector are determined, the gain code book search circuit 40 refers to gain term data from the gain code book 19 to calculate the gains of the two excitations and transfers the code DG of them to the multiplexer 41. The multiplexer 41 combines the codes CL, CD, CS and CG into a transmission code CT and transfers the transmission code CT to the decoding section 2 through the transmission line 3.

In the decoding section 2, the demultiplexer 21 demultiplexes the transmission code CT inputted thereto from the transmission line 3 into codes CL, CD, CS and CG. The demultiplexer 21 decodes the short-term predictive code CL corresponding to an LPC coefficient into a filter coefficient and transfers the filter coefficient to the synthesis filter 25. From the delay code CD, an adaptive code vector is produced using the adaptive code book 22. From the quantization code CS corresponding to an excitation, an excitation code vector is produced using the excitation code book 23. From the code CG corresponding to gains, gains of the adaptive code vector and the excitation code vector are calculated referring to the gain code book 24, and the excitations are multiplied by the gain terms to produce an input signal to the synthesis filter 25. Finally, using the input signal, the synthesis filter 25 performs synthesis of a sound signal and outputs the sound signal from the output terminal T0.

Here, in order to realize the perceptual weighting filter W(z) by the weighting circuit 14, since the filter coefficient is variable, multiplication of variables is required as seen from the equation (1) given hereinabove. Consequently, a filter of the zero pole type is required. Accordingly, in order to perform the calculation with such a DSP as described above, two RAMs for storing the two variables must be used.

If it is assumed that the sample number n for short-term prediction in the equation (1) is 10 for the convenience of description, then A(z) and W(z) are represented by the following equations (3) and (4), respectively:

$$A(z)=1+a[1]z^{-1}+a[2]z^{-2}+\ldots+a[10]z^{-10} \quad (3)$$

$$W(z)=\frac{1+a[1]\gamma_1 z^{-1}+\ldots+a[10]\gamma_1^{10}z^{-10}}{1+a[1]\gamma_2 z^{-1}+\ldots+a[10]\gamma_2^{10}z^{-10}} \quad (4)$$

where a[1] to a[10] are variables, and accordingly, also $a[1]\gamma1^1$ to $a[10]\gamma1^{10}$ and $a[1]\gamma2^1$ to $a[10]\gamma2^{10}$ are variables.

Where the perceptual weighted signal SW which is an output of the perceptual weighting filter is represented by y(n) and the input speech signal S is represented by x(n), the perceptual weighting filter W(z) is developed in the following manner:

$$y(n)=-\sum_{i=1}^{10}a[i]\gamma_2^i\cdot y(n-i)+\sum_{j=1}^{10}a[j]\gamma_1^j x(n-j)+x(n) \quad (5)$$

The coefficients $a[i]\gamma2^i$, y(n−i), $a[j]\gamma1^j$ and x(n−j) in the equation (5) are variables.

In an ordinary DSP which has one data point for a RAM, the number of processing steps, that is, the calculation time, is long because an operation for storing or saving variables into the RAM is required upon every calculation processed. In particular, multiplication of a RAM storage variable A and another RAM storage variable B, that is, A×B, requires totaling 6 steps including step 1 at which A is read into the data point, step 2 at which A is set to the multiplicand M and the address of A is updated, step 3 at which the address of A is saved temporarily, step 4 at which B is read into the data point, step 5 at which B is set to the multiplier N and the address of B is updated and step 6 at which M×N is executed and the address of B is saved temporarily.

In the conventional speech coding apparatus described above, when a perceptual weighting filter is realized, since the filter coefficient of the filter is variable, the filter must be a filter of the zero pole type for which multiplication between variables is required. Consequently, when calculation processing is performed by a DSP, two RAMs for storing the two variables corresponding to the individual data points are required. Thus, the conventional speech coding apparatus is disadvantageous in that it requires a comparatively great number of steps and hence a comparatively large calculation time because operations to store and save the variables into the RAMs are required each time calculation is performed for each of the data points.

SUMMARY OF THE INVENTION

It is an object of the present invention to provide a speech coding apparatus which realizes a perceptual weighting filter with a comparatively small amount of calculation.

In order to attain the object described above, according to the present invention, there is provided a speech coding apparatus, which comprises speech analysis means for analyzing a speech signal of a fixed frame length to produce a short-term predictive code representative of a frequency characteristic of the speech signal, weighting means for performing perceptual weighting of the speech signal to produce a weighted speech signal, and excitation quantization code determination means for receiving the weighted speech signal and determining a quantization code of an excitation signal corresponding to an input signal to a speech synthesis filter determined by the short-term prediction code, the weighting means including a coefficient code book for storing perceptual weighting coefficients, coefficient determination means for selecting, from within the coefficient code book, one of the perceptual weighting coefficients which corresponds to the short-term prediction code supplied thereto from the speech analysis means and outputting the selected weighting coefficient, and weighting calculation means for executing a perceptual weighting calculation of the speech signal supplied thereto with the selected weighting coefficient.

In the speech coding apparatus, since the weighting means includes a coefficient code book for storing perceptual weighting coefficients, coefficient determination means for selecting one of the perceptual weighting coefficients which corresponds to a short-term prediction code, and weighting calculation means, one of two coefficients in the weighting calculation can be handled as a constant. Consequently, the speech coding apparatus is advantageous in that the number of calculation steps, that is, the calculation time, can be reduced.

The speech coding apparatus may be constructed such that the coefficient code book stores the perceptual weighting coefficients which correspond in a one-by-one corresponding relationship to all entire codes of the short-term predictive code, and the coefficient determination means selects from within the coefficient code book and outputs one of the perceptual weighting coefficients which corresponds to the short-term prediction code supplied thereto.

Or, the speech coding apparatus may be constructed such that the coefficient code book stores the perceptual weighting coefficients which correspond in a one-by-one corresponding relationship to partial short-term prediction codes which are fixed part of all codes of the short-term prediction code, and the coefficient determination means selects from within the coefficient code book and outputs one of the perceptual weighting coefficients which corresponds to the partial short-term prediction code supplied thereto.

Otherwise, the speech coding apparatus may be constructed such that the coefficient code book stores the perceptual weighting coefficients which realize a plurality of catalog weighting filters which are perceptual weighting filters set in advance, and the coefficient determination means includes filter selection means which selects, in response to the short-term prediction code supplied thereto, as a selected catalog weighting filter, one of the catalog weighting filters which has a characteristic closest to that of a perceptual weighting filter which produces a short-term prediction coefficient corresponding to the short-term prediction code supplied thereto, the coefficient determination means selecting and outputting one of the perceptual weighting coefficients of the coefficient code book which corresponds to the selected catalog weighing filter. In this instance, the filter selection means may employ a linear predictive coding cepstrum distance which is a distance on a spectrum as an evaluation scale for a perceptual weighting filter search.

Or else, the speech coding apparatus may be constructed such that the excitation quantization code determination means includes long-term prediction means for performing long-term prediction to search for a delay code representative of a periodicity of the speech signal and an adaptive code vector corresponding to the delay code, excitation search means for determining, from an excitation code book in which excitation vectors each in the form of a quantization code representative of a residual signal after the long-term prediction are stored, an optimum quantization code and an excitation vector corresponding to the optimum quantization code, and gain code book search means for determining, from a gain code book in which quantization gains obtained by conversion into vectors and quantization of gains of adaptive code vectors and excitation vectors are stored, quantization gains.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
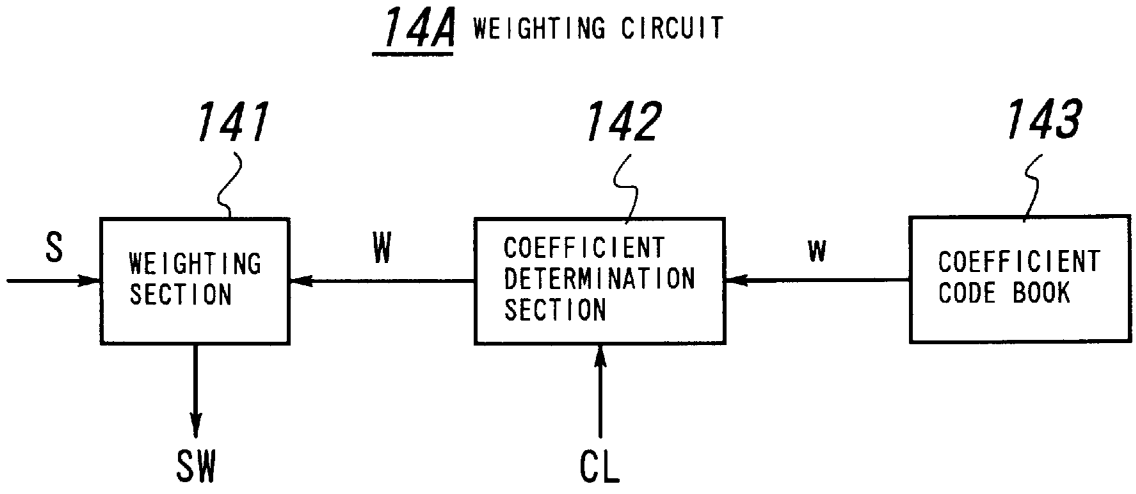
FIG. 1 is a block diagram showing a weighting circuit incorporated in a speech coding apparatus to which the present invention is applied.
Figure 4:
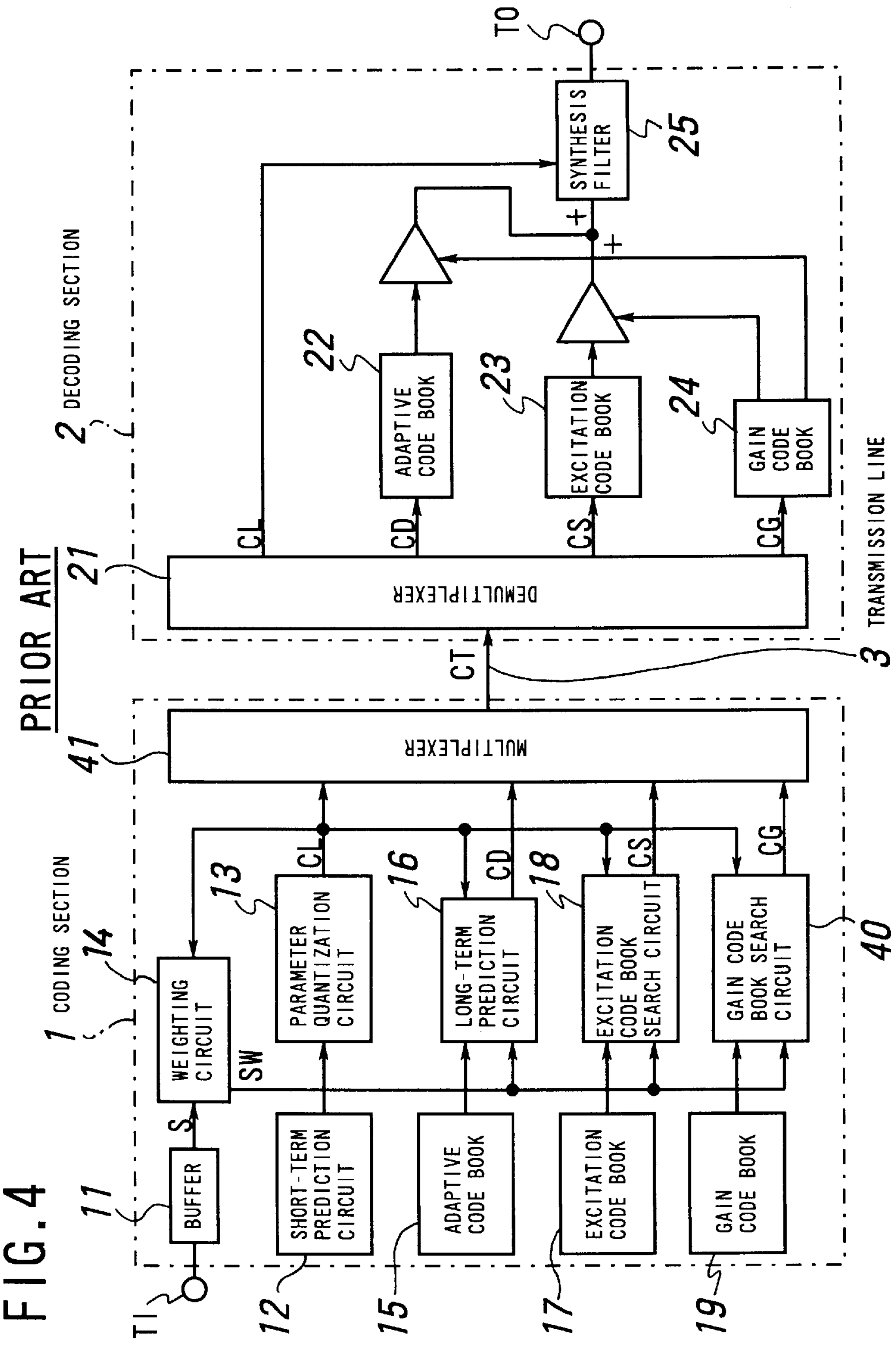
FIG. 4 PRIOR ART
FIG. 4 is a block diagram showing a conventional speech coding apparatus of the CELP system.

A speech coding apparatus to which the present invention is applied is an improvement to and different from the conventional speech coding apparatus described hereinabove with reference to FIG. 4 in construction of its weighting circuit. The circuit construction of a first form of the weighting circuit is shown in FIG. 1. Referring to FIG. 1, the weighting circuit shown is generally denoted at 14A and includes a weighting section 141 for performing a perceptual weighting calculation, a coefficient code book 143 formed from a ROM in which perceptual weighting coefficients w corresponding in a one-by-one corresponding relationship to all codes of the short-term predictive code CL of 30 bits are stored, and a coefficient determination section 142 for selecting, by table looking up processing from the coefficient code book 143, a perceptual weighting coefficient w corresponding a short-term predictive code CL supplied thereto from a parameter quantization circuit.

Operation of the weighting circuit 14A will be described with additional reference to FIG. 4. First, the coding section 1 LPC analyzes a speech signal SI similarly as in the conventional speech coding apparatus described hereinabove and outputs a short-term predictive code CL from the parameter quantization circuit 13 thereof. Here, for the convenience of description, it is assumed that the code length of the short-term predictive code CL per a processing unit (one frame) is 30 bits with which an LPC coefficient can be usually represented sufficiently. Meanwhile, the weighting circuit 14A receives a speech signal S from the buffer circuit 11, performs perceptual weighting processing in the following manner and outputs a resulting weighted speech signal SW. In particular, the coefficient determination section 142 of the weighting circuit 14A receives the short-term predictive code CL, extracts a perceptual weighting coefficient W corresponding to the code CL from the coefficient code book 143 by table referring processing, and supplies the corresponding coefficient data W to the weighting section 141. The weighting section 141 performs weighting of the speech signal S using the coefficient data W to produce a weighted speech signal SW.

Consequently, the coefficient data W can be handled as a constant in the multiplication with the speech signal S by the weighting section 141. Accordingly, the multiplication can be processed by one step as a constant multiplied by a variable.

The coefficient code book 143 holds perceptual weighting coefficients W in a one-by-one corresponding relationship to all codes of the short-term predictive code CL. Accordingly, the size of the code book 143 is equal to the number of kinds of the short-term predictive code CL. For example, if the sample number n in short-term prediction is 10 similarly as in the conventional speech coding apparatus, the number of the weighting coefficients w per one code is 20. Where the code length of the coefficients W is equal to one word, since the short-term code length is 30 bits as described above, the required memory capacity for the ROM of the coefficient code book 143 in this instance is $2^{30}\times 20 \cong 21.5$ Mwords.

Figure 2:
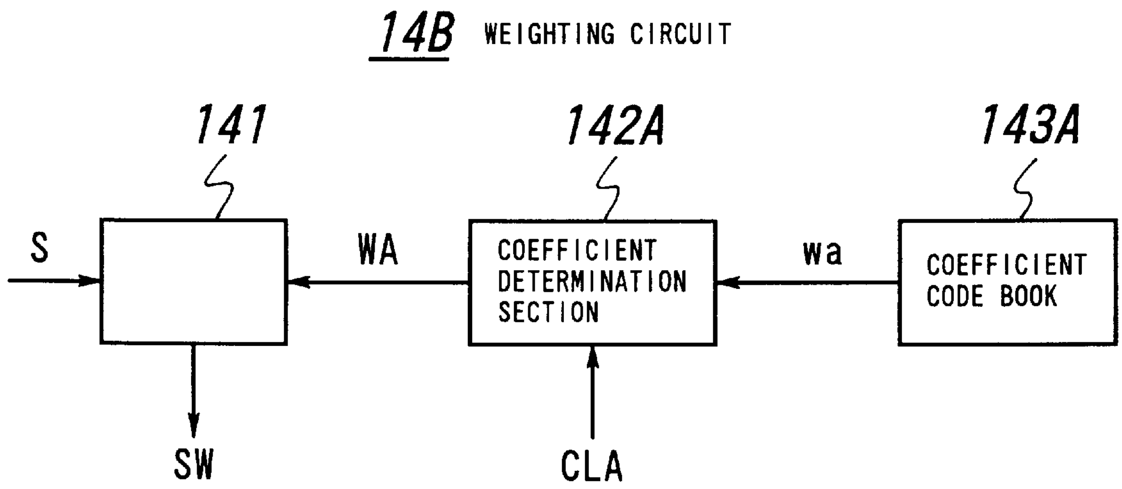
FIGS. 2 and 3 are block diagrams showing different weighting circuits incorporated in the speech coding apparatus to which the present invention is applied.

FIG. 2 shows another weighting circuit which can be incorporated in the speech coding apparatus according to the present invention. The speech coding apparatus is generally denoted at 14B and is a modification to the weighting circuit 14A described hereinabove. The weighting circuit 14B is different from the weighting circuit 14A in that it includes, in place of the coefficient code book 143, a coefficient code book 143A formed from a ROM in which perceptual weighting coefficients wa corresponding in a one-by-one corresponding relationship to part of codes of the short-term predictive code CL of 30 bits, for example, to partial short-term predictive codes CLA of 7 bits are held, and includes, in place of the coefficient determination section 142, a coefficient determination section 142A for selecting, by table referring processing from the coefficient code book 143A, a perceptual weighting coefficient wa corresponding to a partial short-term predictive code CLA.

In the speech coding apparatus in which the weighting circuit 14B is incorporated, an LPC coefficient calculated by the short-term prediction circuit 12 is quantized by the parameter quantization circuit 13 which performs two-stage vector quantization in which quantization is performed in two stages, and a quantization output at the first stage is used as the partial short-term predictive code CLA.

The required memory capacity for the ROM of the coefficient code book 143A in the weighting circuit 14B is, where the condition is the same as in the weighting circuit 14A, $2^{7}\times 20=2{,}560$ words. Consequently, the required memory capacity can be reduced remarkably from that of the ROM of the coefficient code book 143A in the weighting circuit 14A.

Figure 3:
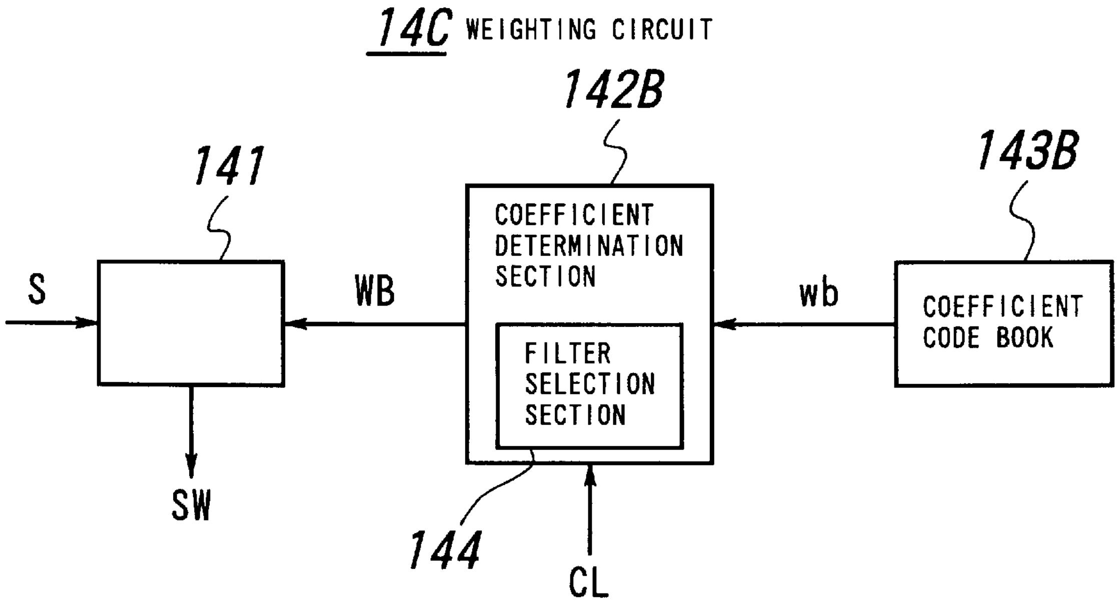

FIG. 3 shows a further weighting circuit which can be incorporated in the speech coding apparatus according to the present invention. The weighting circuit shown is generally denoted at 14C and is a modification to the weighting circuit 14A described hereinabove. The weighting circuit 14C is different from the weighting circuit 14A in that it includes, in place of the coefficient code book 143, a coefficient code book 143B formed from a ROM in which weighting coefficients wc of, for example, 7 bits which realize a plurality of catalog weighting filters as perceptual weighting filters set in advance are held and includes, in place of the coefficient determination section 142, a coefficient determination section 142B which selects, by table looking up processing from the coefficient code book 143B, a weighting coefficient wb of a catalog weighting filter having a characteristic closest to a perceptual weighting filter corresponding to a short-term (LPC) coefficient calculated by the short-term prediction circuit 12 in response to a short-term predictive code CL supplied thereto.

The coefficient determination section 142B includes a filter selection section 144 which selects a desired catalog weighting filter using an LPC cepstrum distance which is a distance on a spectrum as an evaluation scale in a perceptual weighting filter search.

Here, the cepstrum is reverse Fourier transform of a logarithm of the square of the absolute value of a short-term spectrum $S(\omega)$ of an acoustic signal and is a function of the frequency $\tau$ of the time dimension as recited in Nobuo Inoue, "Application of Digital Signal Processing", the Electronic Communications Society of Japan, 1981, pp.195–197. A low quefrency portion ($\tau$=0 to 2 ms) of the cepstrum corresponds to a spectrum envelope portion, and another portion higher than the low frequency portion corresponds to a driving excitation signal.

Since the required memory capacity for the ROM of the coefficient code book 143B in the third weighting circuit 14C is independent of the number of kinds of codes of the short-term predictive code CL, it can be further reduced comparing with that in the second weighting circuit by suitably setting the catalog weighting filter.

While the preferred embodiment of the present invention is described above, the present invention is not limited to the specific embodiment, and the embodiment can be modified in various manners.

For example, the present invention can be applied not only to audio coding apparatus of the CELP system but also to speech coding apparatus of the multipass coding system or the residual driving speech coding system.

Further, for the partial short-term predictive code in the second form of the weighting circuit, a code at the second stage of two-stage vector quantization, a code by a split vector quantization or the like may be employed instead of a vector quantization code at the first stage of two-stage vector quantization.

Further, for a weighting coefficient search of the filter selection section in the third form of the weighting circuit, in place of the LPC cepstrum distance, some other distance scale such as a Euclidean distance or a distance scale in the form of a parameter such as an LSP parameter obtained by suitable conversion may be employed.

Further, in place of the LPC analysis, some other analysis method such as a BURG method which extracts an LSP parameter or the like may be employed for short-term prediction.

Further, even where the excitation search circuit has, in place of the one stage construction, a multiple stage construction to raise the order number of gain vectors, similar effects can be obtained apparently.

Furthermore, while an excitation code book search is used for the excitation searching method, similar effects can be obtained even where a multipass search, an impulse or waveform coding is used.

In addition, similar effects can be obtained apparently even where some other spectrum parameter such as a PARCOR coefficient than the LPC coefficient is used.

Having now fully described the invention, it will be apparent to one of ordinary skill in the art that many changes and modifications can be made thereto without departing from the spirit and scope of the invention as set forth herein.

What is claimed is:

1. A speech coding apparatus, comprising:

speech analysis means for analyzing a speech signal of a fixed frame length to produce a short-term predictive code representative of a frequency characteristic of the speech signal;

weighting means for performing perceptual weighting of the speech signal to produce a weighted speech signal; and excitation quantization code determination means for receiving the weighted speech signal and determining a quantization code of an excitation signal corresponding to an input signal to a speech synthesis filter determined by the short-term prediction code;

said weighting means including a coefficient code book for storing perceptual weighting coefficients, coefficient determination means for selecting, from within said coefficient code book, one of the perceptual weighting coefficients which corresponds to the short-term prediction code supplied thereto from said speech analysis means and outputting the selected weighting coefficient, and weighting calculation means for executing a perceptual weighting calculation of the speech signal supplied thereto with the selected weighting coefficient.

2. A speech coding apparatus as claimed in claim 1, wherein said coefficient code book stores the perceptual weighting coefficients which correspond in a one-by-one corresponding relationship to all entire codes of the short-term predictive code, and said coefficient determination means selects from within said coefficient code book and outputs one of the perceptual weighting coefficients which corresponds to the short-term prediction code supplied thereto.

3. A speech coding apparatus as claimed in claim 1, wherein said coefficient code book stores the perceptual weighting coefficients which correspond in a one-by-one corresponding relationship to partial short-term prediction codes which are fixed part of all codes of the short-term prediction code, and said coefficient determination means selects from within said coefficient code book and outputs one of the perceptual weighting coefficients which corresponds to the partial short-term prediction code supplied thereto.

4. A speech coding apparatus as claimed in claim 1, wherein said coefficient code book stores the perceptual weighting coefficients which realize a plurality of catalog weighting filters which are perceptual weighting filters set in advance, and said coefficient determination means includes filter selection means which selects, in response to the short-term prediction code supplied thereto, as a selected catalog weighting filter, one of said catalog weighting filters which has a characteristic closest to that of a perceptual weighting filter which produces a short-term prediction coefficient corresponding to the short-term prediction code supplied thereto, said coefficient determination means selecting and outputting one of the perceptual weighting coefficients of said coefficient code book which corresponds to the selected catalog weighing filter.

5. A speech coding apparatus as claimed in claim 4, wherein said filter selection means employs a linear predictive coding cepstrum distance which is a distance on a spectrum as an evaluation scale for a perceptual weighting filter search.

6. A speech coding apparatus as claimed in claim 1, wherein said excitation quantization code determination means includes long-term prediction means for performing long-term prediction to search for a delay code representative of a periodicity of the speech signal and an adaptive code vector corresponding to the delay code, excitation search means for determining, from an excitation code book in which excitation vectors each in the form of a quantization code representative of a residual signal after the long-term prediction are stored, an optimum quantization code and an excitation vector corresponding to the optimum quantization code, and gain code book search means for determining, from a gain code book in which quantization gains obtained by conversion into vectors and quantization of gains of adaptive code vectors and excitation vectors are stored, quantization gains.

* * * * *